UNITED STATES PATENT OFFICE.

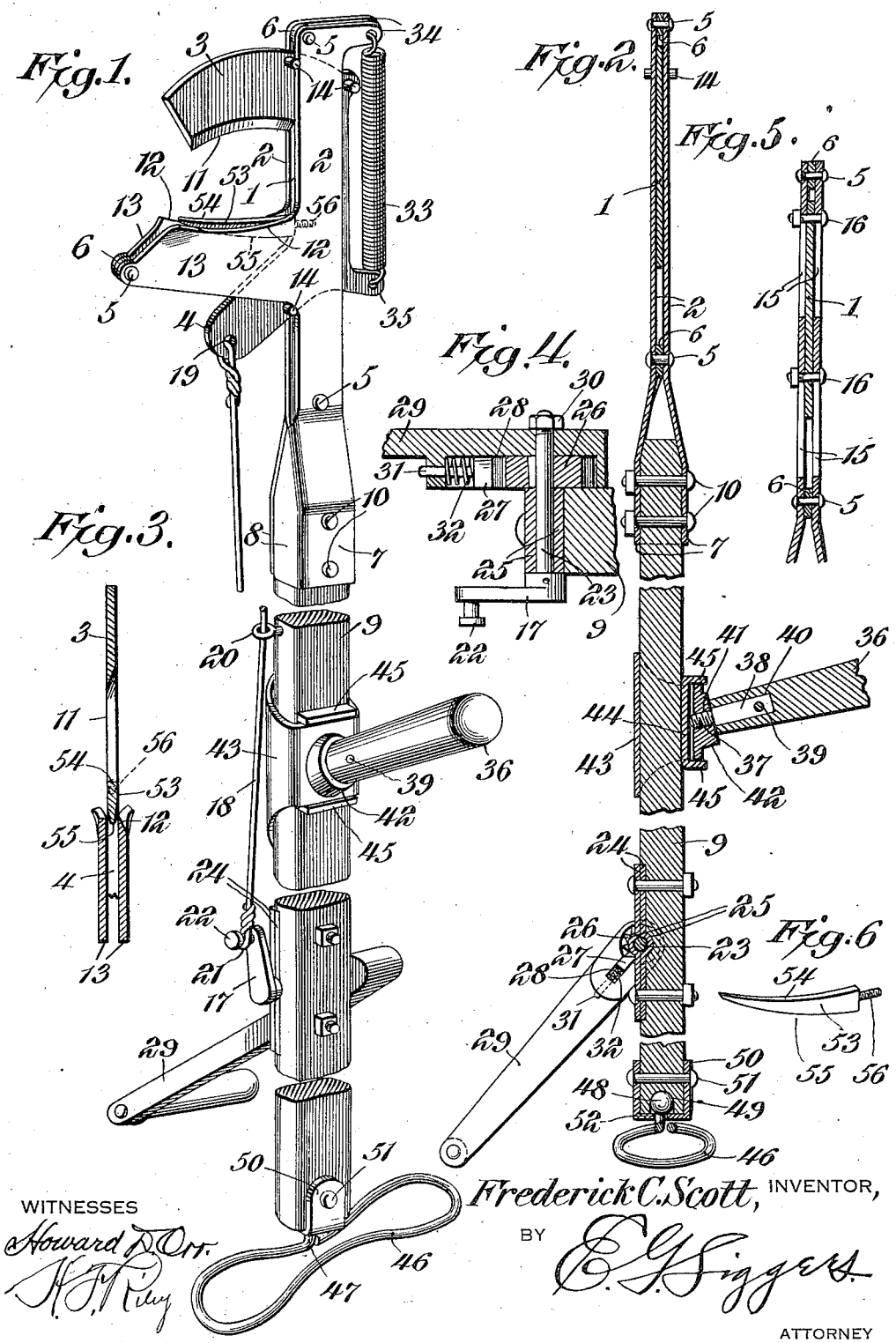

FREDERICK C. SCOTT, OF HORNBY ISLAND, BRITISH COLUMBIA, CANADA, ASSIGNOR TO FRANK WILLIAM TROUNCE, OF BUFFALO, NEW YORK.

PRUNING IMPLEMENT.

1,092,954. Specification of Letters Patent. Patented Apr. 14, 1914.

Application filed July 29, 1912. Serial No. 712,135.

*To all whom it may concern:*

Be it known that I, FREDERICK C. SCOTT, a subject of the King of Great Britain, residing at Hornby Island, in the Province of British Columbia and Dominion of Canada, have invented a new and useful Pruning Implement, of which the following is a specification.

The invention relates to improvements in pruning implements.

The object of the present invention is to improve the construction of pruning implements, and to provide a simple, efficient and comparatively inexpensive pruning knife, adapted to be easily operated and readily passed between the limbs of trees, and capable, in severing a limb, of making a clean cut without bruising the bark.

A further object of the invention is to provide a pruning implement of this character, equipped with a blade adapted to cut through a limb from the top, so that after the limb has been severed, the implement will lie beneath the same to enable the instrument to be readily withdrawn from the tree without becoming entangled in the same.

With these and other objects in view, the invention consists in the construction and novel combination of parts hereinafter fully described, illustrated in the acccompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a pruning implement, constructed in accordance with this invention, parts being broken away in order to show the mechanism on a larger scale. Fig. 2 is a longitudinal sectional view of the same. Fig. 3 is an enlarged detail sectional view, illustrating the construction of the cutting mechanism. Fig. 4 is a transverse sectional view, illustrating the construction of the operating mechanism for actuating the blade. Fig. 5 is a detail sectional view, illustrating another means for slidably mounting the blade in the guide. Fig. 6 is a detail view of the cleaning device.

Like numerals of reference designate corresponding parts in all the figures of the drawing.

In the accompanying drawing in which is illustrated the preferred embodiment of the invention, the pruning implement comprises in its construction a slidable blade 1, consisting of a body portion slidably mounted between guide plates 2 and provided at the top with a projecting cutting portion 3 and having an inclined projecting arm 4 at the lower end. The guiding plates 2, which are constructed of suitable metal, are secured in spaced relation by means of rivets 5, or other suitable fastening devices, and washers 6 mounted on the rivets and interposed between the guide plates, which have their lower terminals 7 spread and provided with side flanges 8 to form a socket for the upper end of a pole 9. The upper end of the pole 9 is fitted in the socket formed by the lower portions of the guiding plates, which are secured to the pole by bolts 10, or other suitable fastening devices.

The projecting cutting portion, which is curved to hook over the top of a limb, has a lower concavely curved cutting edge 11, beveled and coöperating with oppositely beveled concavely curved upper edges 12 of spaced arms 13, formed integral with the guide plates and adapted to receive the cutting edge 11 of the blade between them, and coacting with the blade to enable the implement to sever a limb with a clean cut without injurying the bark. In the use of the implement, the arms 13, which extend forwardly from the front side edges of the guide plates 2, are placed beneath the limb and support the same during the cutting operation, and the beveled upper edges of the arms also permit the limb to spread or open at the cut so as to free the blade.

The guide plates are provided with parallel front and rear edges, and the blade is equipped with transverse pins or studs 14, which coöperate with the straight side edges of the guide plates to maintain the blade in proper position between the said plates during the operation of the implement. The pins or studs 14 pierce the blade and project from the side faces thereof, a pair being arranged at the outer end of the blade and a single pin or stud being provided at the inner portion of the blade at the arm where the power is applied to operate the said blade. Instead, however, of slidably connecting the blade with the guide plates by the pins or studs shown in Figs. 1 and 2, the guide plates may, as illustrated in Fig. 5, be provided with opposite longitudinal slots 15 for the reception of one or more bolts 16, piercing the blade and slidable in the slots 15.

The arm 4 of the blade is connected with a crank 17 by a wire 18, or other suitable flexible connection, having its upper terminal passed through a perforation 19 in the arm 4 and twisted on itself or otherwise secured to the said arm. The connecting wire or rod is designed in practice to extend through one or more guides 20, mounted on the pole and consisting of screw eyes or other suitable devices. The crank 17 extends upwardly when the blade is raised and the downward swinging of the crank through the means hereinafter described, moves the blade downwardly in the direction of the arms 13. The strain incident to the downward movement of the blade is longitudinally of the pole and a relatively light pole may be used without danger of breakage. The lower end of the wire 18 is bent to form a loop 21 and is twisted above the loop through which the pin 22 of the crank extends.

The crank 17, which is formed integral with or otherwise secured to a shaft 23, is located at one end of the same and the said shaft is journaled in a suitable bearing formed by plates 24, bolted or otherwise secured to the pole at one side thereof and having oppositely grooved portions 25 coöperating to form a bearing opening for the shaft 23. The crank is located at one of the side edges of the pole, and the shaft is equipped at the other side edge with a ratchet wheel 26, keyed or otherwise secured to the shaft and engaged by a spring actuated pawl or dog 27, which is mounted in a slot or recess 28 of a crank handle 29. The crank handle 29 is secured on the shaft 23 by means of a nut 30, or other suitable fastening device. The pawl or dog, which is guided in the slot or recess 28, is provided with a stem 31, piercing the outer wall of the recess and having a coiled spring 32 disposed on it and interposed between the pawl or dog and the said outer wall of the recess for moving the pawl or dog inwardly into engagement with the ratchet wheel. The pawl and ratchet connection between the crank handle and the crank shaft enables the crank handle to be placed in the most convenient position for operation and permits the shaft to be operated by a succession of relatively short strokes, whereby the knife may be forced through a limb with greater facility than when a single continuous forward movement of a crank or handle is required. Furthermore, the ratchet mechanism permits the handle to be moved back in this way without necessarily carrying the blade with it. The ratchet mechanism may be omitted and, if desired, gearing may be employed for enabling greater power to be applied in operating the implement, which may be constructed for cutting brush, dehorning cattle, and various other cutting operations.

The blade is automatically opened by means of a coiled spring 33, located at the back of the blade and extending longitudinally of the implement and connected at its outer end with rearwardly extending projections 34 of the guide plates, and at its lower end with a rearwardly extending projection 35 of the blade. The projection 35, which is located at the inner end of the body portion of the blade, is arranged in substantial parallelism with the projections 34, and the said projections 34 and 35 space the spring 33 from the guide plates and the body portion of the blade, so that the same do not interfere with the action of the said spring 33, in the automatic opening of the implement.

The pruning implement is equipped at one side of the hole with a detachable and adjustable handle 36, constructed of wood, or other suitable material and provided at its inner end with an attaching screw 37 having a squared shank 38, secured by a rivet 39, or other suitable fastening device, in a socket 40 in the inner or lower end of the handle 36, which is set at a slight inclination. The screw 37 engages a threaded opening 41 in a boss or enlargement 42 of a sleeve 43. The boss or enlargement 42 has an inclined face, which forms a seat for the inner end of the handle 36 and supports the latter at an inclination. The sleeve 43 slidably embraces the pole and is substantially oblong in cross section to conform to the configuration of the pole, but a pole of any desired form may, of course, be employed. The screw 41 pierces the boss or enlargement and is adapted to engage a clamping plate 44, arranged within the sleeve and coöperating with the same to grip the pole, whereby the handle is secured in its adjustment. The clamping plate has its terminals extended at right angles to form projecting flanges 45, which are located at the upper and lower edges of the adjacent side of the sleeve 43. The inner end of the handle is cut square or in a plane at right angles to the longitudinal axis of the handle, and when the inner end of the handle abuts against the inclined seat of the sleeve, the clamping plate and the coacting wall of the sleeve are drawn into tight engagement with the pole. By partially rotating the handle and loosening the sleeve, the material may be adjusted along the pole to the desired point. The handle enables the implement to be conveniently held with one hand while the crank is operated by the other hand. The sleeve 43 is tapered toward the boss or enlargement, the side wall 8, which coacts with the clamping plate and engaging the pole, being extended longitudinally to provide a relatively large clamping surface.

In order to facilitate the handling of the pole, the latter is equipped at its lower end with a body rest 46, constructed of wire, or other suitable material, and provided with a centrally arranged stem 47, having a terminal head 48 secured in a socket 49 in the lower end of the pole by an attaching plate 50. The attaching plate 50 is bent into approximately U-shape and secured in the lower end of the pole by a rivet 51, or other suitable fastening device, and it extends across the outer end of the socket 49, being provided thereat with a perforation 52 through which the stem 47 extends. When the rest is constructed of wire, as shown in the accompanying drawing, the material is preferably bent to form opposite loops and is curved longitudinally. The rest is adapted to be placed against any convenient portion of the body and the ball and socket connection between the rest and the lower end of the pole will permit the implement to have a considerable range of adjustment and will greatly facilitate the cutting operation.

The pruning implement is equipped with a cleaning device 53, consisting of a plate or piece extending from the front edge of the blade in approximately a horizontal position and tapered toward its outer end. The upper edge 54 of the cleaning device is concave and the lower edge 55 is convexly curved. The cleaning device is provided at its inner end with a threaded shank 56, which is screwed into a threaded socket in the body portion of the blade, but it may be attached to the same in any other preferred manner. The cleaning device is attached to the body adjacent to the inner end of the arm 4, and when the blade is reciprocated, the cleaning device is moved upwardly and downwardly through the space between the arms 13 and is adapted on the upward stroke to dislodge any bark or other accumulation and prevent the same from collecting between the arms and clogging the guide. The upper concave edge of the cleaning device facilitates the lifting and removal of such accumulation from the space between the arms.

What is claimed is:—

1. An implement of the class described including spaced guide plates provided at the front with projecting arms spaced from the outer ends of the guide plates, a blade slidable between the outer portions of the guide plates beyond the projecting arms thereof and provided with a forwardly projecting cutting portion located beyond the said arms and coacting therewith, operating mechanism connected with the inner portion of the blade, and a coiled spring arranged at the back of the implement and connected with the outer portions of the guide plates beyond the arms thereof and with the blade at the inner portion of the same and adapted to open the implement automatically.

2. An implement of the class described including spaced guide plates provided with forwardly projecting arms spaced from the outer ends of the guide plates, a blade slidable between the outer portions of the guide plates beyond the said projecting arms and having a forwardly projecting cutting portion coacting with the arms and located beyond the same, said blade being provided at its inner end with a projecting arm extending to a point below the projecting arms of the guide plates, and operating mechanism connected with the arm of the blade for moving the latter toward the arms of the guide plates.

3. An implement of the class described including spaced guide plates provided with arms projecting from the guide plates at points intermediate of the ends thereof, a blade slidable between the outer portions of the guide plates beyond the said forwardly projecting arms and having a forwardly projecting cutting portion coacting with the said arms and located beyond the same, said blade being also provided at its inner end with a projecting arm located below the arms of the guide plates, operating mechanism connected with the arm of the blade for moving the latter toward the guide arms, said guide plates being also provided at their outer ends with spaced rearwardly projecting portions, and a coiled spring connected with the inner portion of the blade and extending outwardly beyond the arms of the guide plates and secured to the terminal projections thereof for automatically opening the implement.

4. An implement of the class described including a pole, guide plates secured to the pole, a blade mounted between the guide plates and coacting therewith, a shaft journaled on the pole and provided at one end with a crank having a ratchet wheel at the other end, means for connecting the crank with the blade, an oscillatory crank handle located at the opposite end of the shaft from the said crank and provided at its inner face with an opening receiving and housing the ratchet wheel, and a spring actuated pawl or dog mounted on the crank handle and coacting with the ratchet wheel.

5. An implement of the class described including a pole provided at its inner end with a socket, cutting mechanism arranged at the outer end of the pole, a body rest constructed of wire bent to form opposite loops and curved longitudinally, one of the terminals of the wire being extended to form a projecting stem having a terminal ball secured in the said socket and coacting therewith to form a ball and socket connection between the body rest and the pole to permit a limited swinging movement of the said pole in any direction.

6. An implement of the class described including spaced guide plates having projecting arms, a blade slidable between the guide plates and provided with a projecting cutting portion coacting with the arms, and a cleaning device carried by the blade and movable between the arms for dislodging accumulation from the same.

7. An implement of the class described including spaced guide plates provided with forwardly projecting arms, a blade slidable between the guide plates and having a forwardly projecting cutting portion located above and coacting with the arms, and a forwardly projecting cleaning device extending from the front of the blade at a point below the cutting portion thereof and arranged to be carried into and out of the space between the arms by the movements of the blade.

8. An implement of the class described including spaced guide plates provided with projecting arms, a blade slidable between the guide plates and having a cutting portion coacting with the arms, and a projecting cleaning device mounted on the blade and having a concave upper edge and operable in the space between the arms for dislodging accumulation therefrom.

9. An implement of the class described including spaced guide plates provided with projecting arms, a blade slidable between the guide plates and having a cutting portion coacting with the arms, and a cleaning device carried by the blade and projecting therefrom and operable in the space between the arms to dislodge accumulation therefrom, said cleaning device being tapered outwardly and presenting a concave upper edge and a convex lower edge.

In testimony that I claim the foregoing as my own, I have hereto affixed my signature in the presence of two witnesses.

FREDERICK C. SCOTT.

Witnesses:
WM. BOSSON,
HELEN A. WATSON.

---

Copies of this patent may be obtained for five cents each, by addressing the "Commissioner of Patents, Washington, D. C."